Figure 1:
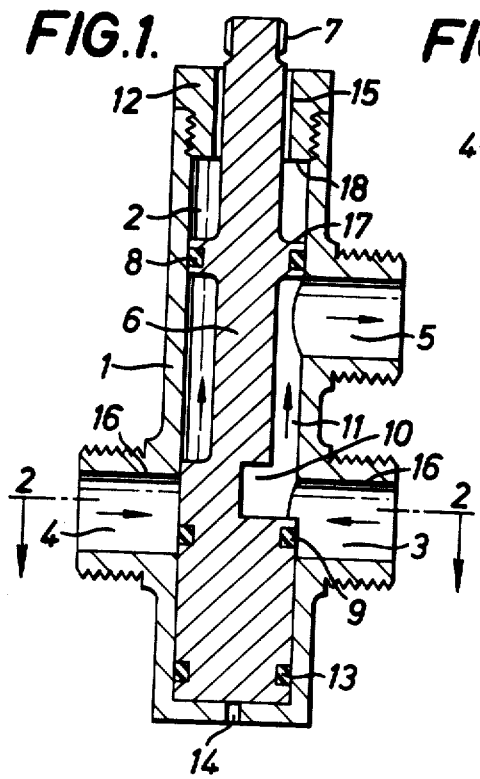

United States Patent [19]
Watts

[11] 3,893,481
[45] July 8, 1975

[54] MIXER TAPS OR VALVES

[75] Inventor: Horace Watts, Pinner, England

[73] Assignee: H. & D. E. Watts Limited, Pinner, England

[22] Filed: Mar. 13, 1973

[21] Appl. No.: 340,688

[52] U.S. Cl. ...... 137/625.17; 137/625.4; 137/636.4
[51] Int. Cl. ............................................ F16k 11/02
[58] Field of Search............ 137/625.4, 625.48, 607, 137/625.17, 636.4; 251/325, 324

[56] References Cited
UNITED STATES PATENTS

| | | | |
|---|---|---|---|
| 630,384 | 8/1899 | Mann.......................... | 137/625.48 X |
| 2,684,691 | 7/1954 | Strickler....................... | 137/625.4 X |
| 2,870,790 | 1/1959 | Jordan.......................... | 137/625.4 X |
| 2,906,492 | 9/1959 | Conrad.............................. | 251/325 |
| 3,000,399 | 9/1961 | Brukner........................ | 137/685.48 |
| 3,042,431 | 7/1962 | Kryzer ...................... | 251/DIG. 1 |
| 3,103,231 | 9/1963 | Moen............................ | 137/625.4 X |
| 3,297,051 | 1/1967 | Church et al. ............. | 137/625.4 UX |
| 3,561,485 | 2/1971 | Klingler ......................... | 137/625.17 |
| 3,678,959 | 7/1972 | Liposky........................ | 137/625.4 X |

FOREIGN PATENTS OR APPLICATIONS

| | | | |
|---|---|---|---|
| 520,915 | 1/1956 | Canada.......................... | 251/DIG. 1 |

*Primary Examiner*—Alan Cohan
*Attorney, Agent, or Firm*—Michael S. Striker

[57] ABSTRACT

A mixer tap or valve for hot and cold water of the kind comprising a housing having a cylindrical chamber therein into which open radially disposed inlets for hot and cold water, respectively, and having at least one outlet for the discharge of cold, hot, or mixed water, said outlet being spaced axially from the inlets, a cylindrical piston which has a sliding fit in the chamber and which has passage means which communicates with the outlet and co-operates with the inlets to select or mix hot and cold water and control the volume thereof respectively on rotation and axial movement of the piston and sealing means between the piston and the chamber comprising a series of co-axially disposed annular seals spaced longitudinally along the piston and located respectively, in annular grooves opening into the cylindrical surface thereof. The characterising features are that at least one of said seals has a slight stretch fit in its groove and is positioned to move across, or partially across, an associated inlet or both inlets upon axial movement of the piston from an open to a closed position, the arrangement being such that surge pressure occurring upstream of said one sealing member at the instant of closure acts on the transverse projected area thereof in the same axial direction as that in which the piston is moving to closure.

3 Claims, 11 Drawing Figures

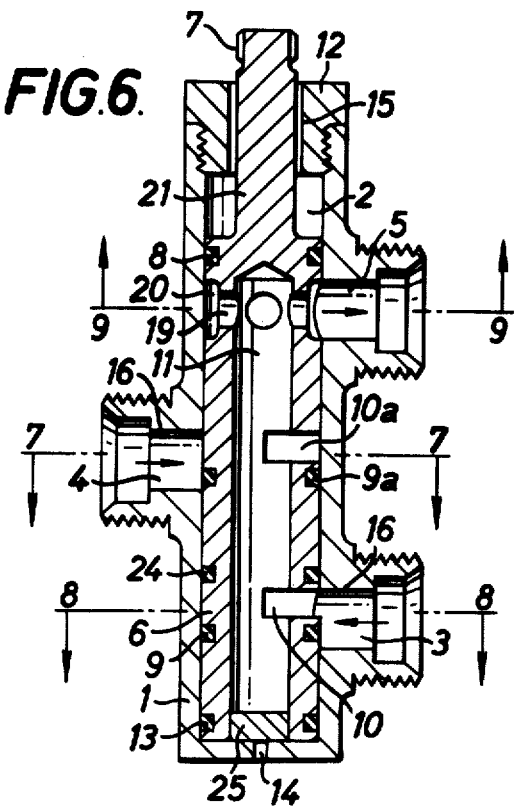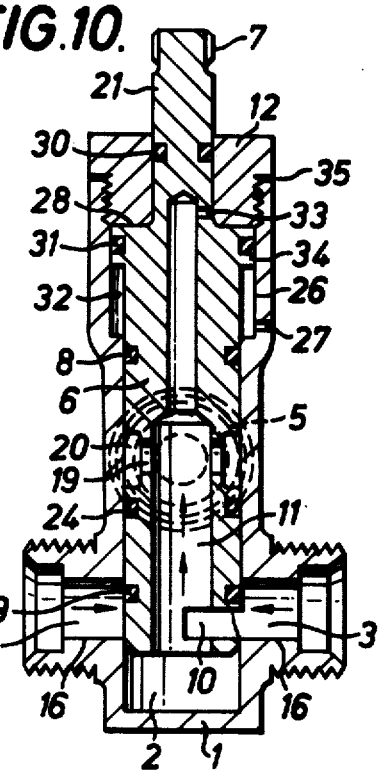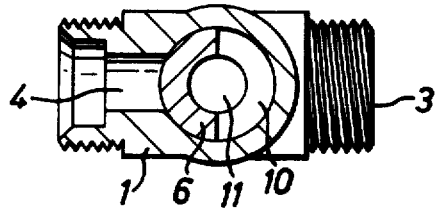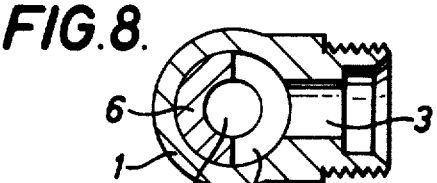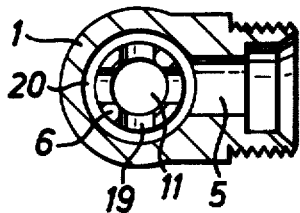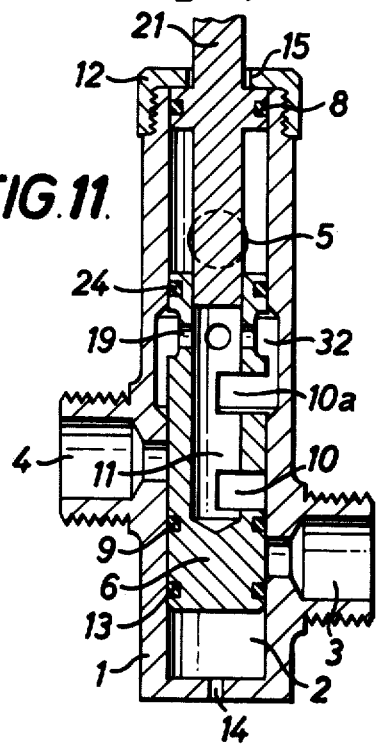

MIXER TAPS OR VALVES

The invention relates to a mixer tap or valve for hot and cold water of the kind in which a cylindrical piston is rotated and reciprocated within a cylindrical chamber to respectively mix hot and cold water and control the volume thereof.

The arrangement hereinafter described of locating an annular seal in a groove formed in the cylindrical surface of the piston and having it pass over a radially disposed port opening from the cylindrical surface of the chamber is usually considered bad practice, as for example is stated in many catalogues issued by the manufacturers of O-rings. It is argued that under such conditions the seal may be nipped or cut as it passes over the edge of the port, and while this may be valid for conditions of high pressure (say 1,500 p.s.i.) we have found that at least within the range of pressures usually associated with water taps (e.g., 0.150 p.s.i.) such an arrangement is entirely feasible provided the conditions hereinafter described are adhered to.

In a known valve of the kind referred to the seal effecting shut-off of the valve is located in an annular groove formed in the cylindrical surface of the chamber and is arranged to pass operatively over a number of axially extending, radially disposed, narrow outlet slots opening into the cylindrical surface of the piston. While this overcomes the possibility of nipping the seal it poses the further problem of how such a relatively inaccessible seal is to be renewed, and this further problem is solved by forming the chamber within a removable sleeve so that the assembly of piston and sleeve, and thereby the sealing means, is removable as a unit. While such a solution is effective it has drawbacks inasmuch as the exterior surface of the sleeve also has to be sealed and in a relatively complicated manner, thereby involving more expense and providing a further potential leakage path for the fluid. The removable assembly of the piston and sleeve is also relatively expensive when replacement is required.

The main object of the present invention is the provision of a mixer tap or valve of the kind referred to in which the necessity for a removable sleeve is dispensed with thereby making for a relatively cheap construction and one in which seal replacement is easily and cheaply effected.

According to the invention a mixer tap or valve for hot and cold water supplies comprising a cylindrical chamber having radially disposed inlet ports for the respective supplies and at least one outlet port for the respective supplies or a mixture thereof, a cylindrical piston arranged for rotation and reciprocation in the chamber and movable axially from an open position to a closed position, passage means in the piston for providing communication between the inlet ports and the outlet port or ports and adapted to cooperate with the inlet ports so as to select or mix the said supplies and to control the volume thereof, and sealing means between the piston and the chamber comprising a plurality of axially spaced coaxially disposed annular sealing members located respectively in annular grooves in the piston and bearing with sliding and sealing engagement against the cylindrical surface of the chamber, is characterised in that at least one of said sealing members has a slight stretch fit in its groove and positioned to move across, or partially across, an associated inlet port or both inlet ports upon axial movement of the piston to said closed position, the arrangement being such that surge pressure occurring upstream of said one annular sealing member at the instant of closure acts on the transverse projected area thereof in the same axial direction as that in which the piston is moved to close the valve.

The inlet ports may be arranged to open in line from diametrically opposed sides of the chamber and the sealing means may be constructed and arranged so as to provide, respectively, at least one seal between the inlet and outlet ports and on the remote sides thereof, in the closed position of the piston.

Alternatively the inlet and outlet ports may be spaced (i.e., staggered) longitudinally with respect to each other and the sealing means may be constructed and arranged so as to provide, respectively, at least one seal intermediate each of the ports and on the remote side of each end port, in the closed position of the valve.

Figure 2:
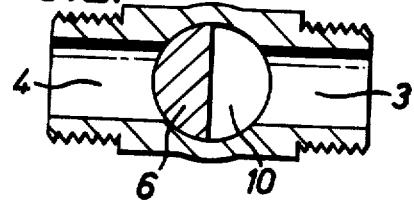
Figure 3:
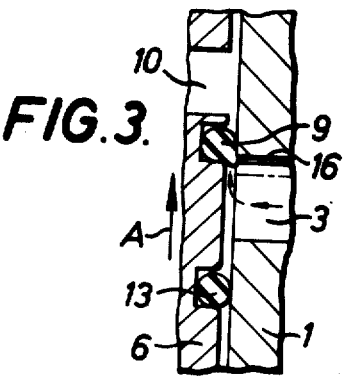

A specific embodiment of the invention and some alternative forms thereof will now be described with reference to the accompanying drawings in which like items have been given like reference numbers, and in which:

FIG. 1 is a longitudinal sectional view through part of one form of mixer tap according to the invention, FIG. 2 is a section on the line 2—2 of FIG. 1, FIG. 3 is a diagrammatic view, on an enlarged scale, showing the closure seal (i.e., the said one seal) contacting the edge of the inlet port (representing the moment of closure) on movement of the piston of the tap of FIG. 1, towards the closed position.

Figure 4:
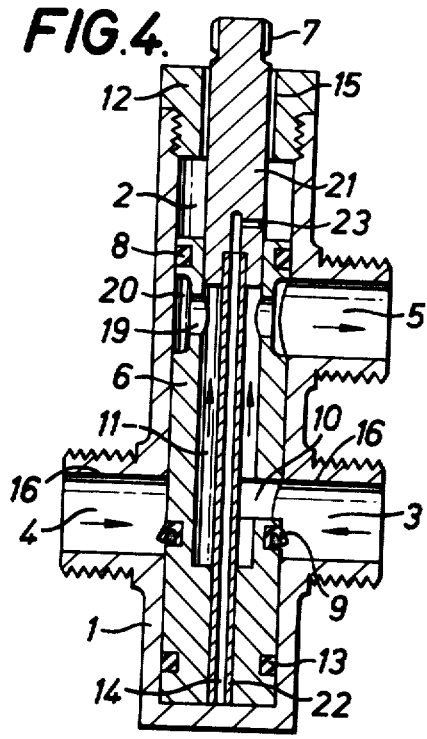
Figure 5:
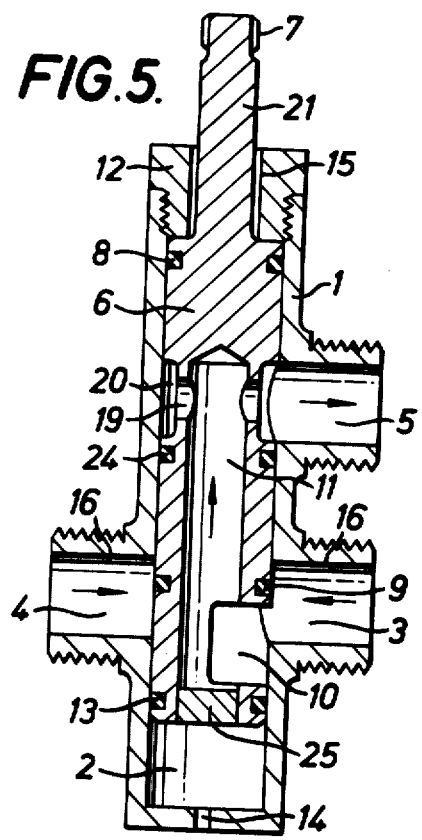

FIG. 4 is a view, generally similar to FIG. 1, of a mixer tap having a modified piston, FIG. 5 is a longitudinal sectional view of part of a further form of mixer tap according to the invention, FIG. 6 is a longitudinal sectional view of part of a still further form of mixer tap according to the invention, FIGS. 7, 8 and 9 are sections taken on the lines 7—7, 8—8 and 9—9 of FIG. 6, respectively, and FIGS. 10 and 11 are sectional longitudinal views of two other forms of mixer tap according to the invention.

The mixer tap or valve shown in part in FIGS. 1 and 2 comprises a housing 1 provided with a cylindrical bore or chamber 2 into which open separate, radially disposed hot and cold water inlet ports 3, 4 respectively, and an outlet port 5 for the discharge of hot, cold or mixed water.

A piston 6 is disposed within the chamber 2 such that it can be rotated and reciprocated therein by a manual control means (not shown) such as for example a push-pull and rotatable knob which may be attached to the serrated end 7 of the piston 6.

The piston 6 is fitted with annular seals 8, 13 respectively adjacent each end, and with a further annular seal 9 intermediate the end seals which is adapted to pass partially over the inlet ports 3, 4 on the occasion of axial movement of the piston. The seals 9, 8 and 13 are located respectively in annular grooves formed in the cylindrical surface of the piston 6 and co-operate with the cylindrical surface of the chamber 2 to respectively shut off the valve and prevent leakage to atmosphere when the valve is shut off. It will be observed that the seals are withdrawable with the piston from the chamber so as to facilitate replacement of the seals.

The piston 6 is cut away to form an arcuate slot 10 which adjoins an annulus or passage 11, and the annulus 11 extends axially along the chamber to communicate with the outlet port 5. The slot 10 may be selectively positioned with respect to either or both of the inlet ports 3, 4, by rotation of the piston 6 in the chamber 2.

As drawn in FIG. 1, the valve is shown in the fullyopen position with the annular seal 9 overlapping the inlet ports 3, 4 and the slot 10 fully in communication with the hot water inlet port 3. Rotation of the piston 6 will progressively close the hot water inlet port 3 while progressively opening the cold water inlet port 4, thereby varying the temperature of the water leaving the outlet 5 from hot to cold. Movement of the piston 6 axially upwards will progressively close the or each inlet port 3, 4 and vary the volume of water discharged without substantially affecting the temperature of the discharge. When the seal 9 passes the upper edges of the inlet ports 3, 4 the valve is shut off.

The chamber 2 is closed at its upper end by a cover cap 12 which has a clearance fit with the piston 6 thereby providing a vent annulus 15 through which air may pass from the top of the chamber 2 to atmosphere. The chamber 2 is also provided with a vent hole 14 in the bottom end wall whereby air below the piston 6 may also be vented to atmosphere. The annular seals 8, 9 and 13 have identical sealing diameters whereby the piston 6 is balanced in all positions.

The axial travel of the piston 6 is limited in the upward direction by a shoulder 17 formed on the piston 6 which contacts the lower surface 18 of the cover cap 12 at the extreme limit of upward movement. The downward travel of the piston is limited by the bottom end of the piston contacting the bottom wall of the chamber 2.

The annular seal 9 is shown as an O-ring and it will be observed that when the piston 6 is in the fully open position shown, the seal 9 is arranged to stop short of the lower edges of the inlet ports 3, 4. While this is not strictly necessary it has the advantage of eliminating a further possible wear point thereby increasing the life of the seal 9.

As previously stated we have found that at least within the range of pressures usually associated with mixer taps of this kind, a seal located in an annular groove formed on the piston may be arranged to pass over the edge of an inlet port provided the seal has a slight stretch fit in the groove and the valve is designed so that the upstream water pressure acts on the seal at the moment it is passing the edge of the port, in the same axial direction as the piston is moving.

FIG. 3 shows the annular seal 9 of FIG. 1 contacting the upper edge 16 of the inlet port 3 and this represents the instant at which the valve closes. The movement of the piston 6 is indicated by the arrow A, and the direction of water pressure is indicated by the flow line arrows.

Movement of the piston 6 in the direction of arrow A causes the seal 9 to drag to one side of its groove as shown, and as the seal 9 contacts the upper edge 16 of the inlet port 3 it tends to bulge locally into the port and get nipped as shown. If, however, the water pressure is arranged to act in the direction indicated by the flow line arrows this pressure tends to nullify this nipping action. The net result is that the seal 9 gets pushed back into its groove by the water pressure as it rolls over the edge 16 of the port 3.

A further feature which can accentuate this tendency for the seal to get nipped is if the seal has not a slight stretch fit in the groove. An unstretched seal is in peripheral compression and tends to bulge locally even further into the inlet port as it moves across it.

In the various embodiments of the invention hereinafter described with reference to FIGS. 4 to 10 the various parts of the valves are equivalent to the corresponding parts of the valve shown in FIGS. 1 to 3 and are identified by similar reference numerals. The valves function in a similar manner and it is therefore proposed to describe only the major differences between them. In FIGS. 4 to 10 the valves are shown in the open position and the direction of flow is indicated by the arrows. In FIG. 11 the valve is shown in the closed position.

In the construction shown in FIG. 4 the piston 6 is provided with a central passage 11 which communicates at its lower end with an arcuate slot 10 which, as before, is adapted to co-operate with a pair of radially disposed hot and cold water inlet ports 3, 4. The passage 11 extends longitudinally along the piston and communicates, at its upper end, with the outlet port 5 via a series of radially disposed holes 19 in the piston and via an annulus 20 formed between the piston 6 and the chamber 2. A spindle 21 is brazed into the upper end of the passage 11 and extends from the chamber 2 through a cover cap 12 to the exterior of the valve. The spindle 21 is provided with serrations 7 for the attachment of a control means (not shown). A tube 22 is brazed into the spindle 21 and extends downwardly through the passage 11 and through the lower portion of the piston 6 into which it is also brazed. The bore 14 of the tube 22 allows air to be vented from the underside of the piston 6 through a radially disposed hole 23 in the spindle 21 and into the top of the chamber 2, whence it escapes to atmosphere through a clearance annulus 15 formed between the spindle 21 and the cover cap 12.

As before, the piston 6 is provided with two annular seals 8, 13, respectively adjacent each end to prevent leakage to atmosphere and with an intermediate seal 9 to effect closure of the valve. The seal 9 is here shown as a cup-washer or lip seal directed so that as the piston 6 moves axially towards the closed position the flexible lip of the seal deflects as it trails over the upper edges 16 of the inlet ports 3, 4. We have found that such a seal is even more tolerant of the nipping action hereinbefore described with reference to FIG. 3, even in cases where the edges 16 of the ports 3, 4 are sharp. Such a seal has the disadvantage however of being unidirectional and might be assembled in the wrong direction when renewed by a customer.

In the construction shown in FIG. 5 the piston 6 is arranged to move axially towards the closed position in a direction opposite to that shown in FIGS. 1 to 4. This arrangement necessitates a seal 24 which is extra to the seals shown in FIGS. 1 and 2 to prevent seepage along the exterior of the piston 6 from the inlets 3, 4 to the outlet 5, when the valve is shut off.

As in FIG. 4 the piston 6 is provided with a central passage 11 which communicates with the outlet port 5 via the holes 19 and the annulus 20, and with the or each of the inlet ports 3, 4 via the slot 10. The slot 10 co-operates with the inlet ports 3, 4 in the manner previously described. The lower end of the passage 11 is blanked by a plug 25 to prevent leakage of water from the passage 11 to the underside of the piston 6. As in FIGS. 1 and 2 the chamber 2 is vented to atmosphere respectively from the ends by the vent hole 14 and the vent annulus 15. Alternatively, the piston 6 could be provided with vent means in the form of a centrally disposed tube of the kind shown in FIG. 4.

FIGS. 6 to 9 show an embodiment of the invention in which commingling of the hot and cold water is absolutely prevented when the valve is in the shut position. In this construction the piston is provided with two arcuate slots 10, 10a and the hot and cold water inlet ports 3, 4 are staggered longitudinally with respect to each other. The slots 10, 10a co-operate, respectively, with the inlet ports 3, 4 on movement of the piston 6 and open into a centrally disposed passage 11 in the piston 6 which communicates with the outlet port 5 via the transverse holes 19 and the annulus 20.

The piston 6 is provided with two closure seals 9, 9a which co-operate respectively with the inlet ports 3, 4 with a seal 24 which prevents seepage between the inlet port 4 and the outlet port 5 along the exterior surface of the piston 6 when the valve is shut off, and with two seals 8, 13 respectively adjacent the ends which prevent leakage to atmosphere. As in FIG. 5 the central passage 11 is blanked at its lower end by a plug 25. The chamber 2 is vented at the bottom end by a vent hole 14 and at the top end by a vent annulus 15 formed between the spindle 21 and the cover cap 12.

The valve is shown in a fully open position with the slot 10 fully in communication with the hot inlet port 3 and the slot 10a out of communication with the cold water inlet port 4. Rotation of the piston 6 will progressively close the hot water inlet port 3 while progressively opening the cold water inlet port 4, thereby varying the temperature of the discharged water from hot to cold. Movement of the piston axially upwards will progressively close the or each of the inlet ports 3, 4 thereby varying the volume without substantially affecting the temperature of the discharge. When the seals 9, 9a pass respectively over the upper edges 16 of the ports 3, 4 the valve will be shut off. It will be observed that when the piston is in the closed position the seal 9 prevents seepage along the exterior of the piston 6 between the two inlet ports.

FIG. 10 shows a valve which differs from the valves previously described inasmuch as certain of the annular seals are constructed and arranged so as to provide equal and oppositely directed transverse surfaces on the piston which are subject to water pressure via passages in the piston 6, so as to balance the piston hydraulically. The arrangement also provides a hydraulic resistance to axial movement of the piston which prevents the piston being moved at a rate which would cause excessive cavitation or concussion.

As before, the piston 6 has an arcuate slot 10 which co-operates with the inlet ports 3, 4 to control the flow of water in the manner previously described. The slot 10 communicates with a passage 11 formed in the piston 6 which extends longitudinally thereof for communication with the outlet port 5 in a manner previously described.

In this arrangement the piston 6 moves from the closed to the open position in an upwards direction. As before an annular seal 9 is arranged to pass over the inlet ports 3, 4 on the occasion of axial movement of the piston, and a seal 24 is positioned so as to prevent leakage along the exterior of the piston 6 from the inlet ports 3, 4 to the outlet port 5.

The chamber 2 is enlarged at its upper end 26 to provide an annulus 32 between the chamber 2 and the piston 6, and a portion 34 of the piston 6 is correspondingly enlarged in diameter so that it engages slidingly with the enlarged portion 26 of the chamber 2. Above the enlarged portion 34 the piston is reduced to form a spindle 21 which as before extends through a cover cap 12 for the attachment of a control knob (not shown). O-rings 8, 31 are located on the piston respectively at each end of the annulus 32 and a further O-ring 30 is located between the spindle 21 and the cover cap 12. The annulus 32 is vented to atmosphere by a hole 27 formed in the casing 1, and the connection between the cover cap 12 and the casing 1 is sealed by a joint ring 35. The area of the annular surface 28 formed on the piston 6 between the top end of the chamber 2 and the spindle 21 is precisely equivalent to the cross-sectional area of the bottom end of the chamber 2.

The passage 11 in the piston 6 opens from the underside of the piston 6 and extends axially upwards through a substantial portion of the piston to communicate with a radially disposed bleed hole 33 in the piston 6 located intermediate the seals 30, 31. Thus water pressure entering the inlets 3, 4 has access to the underside of the piston 6 and to the oppositely facing annular surface 28 whereby the piston is balanced in all positions. By suitably proportioning the bleed hole 33 the piston can be given a corresponding hydraulic resistance to axial movement.

FIG. 11 shows a further valve which has similarities with the embodiment shown in FIGS. 6–9 and similar items are similarly numbered. In FIG. 11, the piston 6 has two arcuate slots 10, 10a and the hot and cold water inlet ports 3, 4 are staggered longitudinally so that as the piston 6 is moved downwards from the closed position shown, the slots 10, 10a co-operate, respectively, with the inlet ports 3, 4, to control the flow of water through the valve. The slots 10, 10a open into a central passage 11 in the piston 6.

O-rings mounted on the piston 6 respectively provide, in the closed position shown, a seal 9 intermediate the inlet ports 3, 4, and a seal 24 intermediate the inlet ports and the outlet port 5. Further sealing rings 8, 13 provided on the respective ends of the piston 6 serve to balance the piston in all positions and to prevent leakage to atmosphere.

When the piston 6 is moved axially downwards, from the closed position shown to an open position, the seal 9 moves acros the inlet port 3 and the seal 24 moves into an annulus 32 formed between the piston 6 and the chamber 2, whereby water can then flow from the or each of the inlet ports 3, 4 into the central passage 11 of the piston 6, through a series of transverse holes 19 in the piston 6 and into the annulus 32, whereafter it flows over the O-ring 24 to the outlet port 5.

The chamber 2 is vented to atmosphere at its bottom end by the vent hole 14, and at its top end via the clearance space 15, between the spindle 21 and the cover cap 12, which latter member serves to close the chamber 2 and provides a stop for limiting axial upward movement of the piston 6.

It will be observed that, as in FIGS. 6–9, the O-ring 9 prevents water crossflowing from one inlet to the other inlet when the valve is shut off.

What is claimed is:

1. A mixer tap or valve for hot and cold water supplies comprising a housing having an inner surface defining a cylindrical chamber; laterally disposed inlet ports for the respective supplies, said inlet ports being spaced apart in the longitudinal direction of said chamber and communicating therewith; at least one outlet port for said supplies or a mixture thereof communicating with said chamber; a cylindrical piston arranged for rotation and reciprocation in said chamber and movable axially between an open and a closed position; passage means in said piston for providing communication between said inlet ports and said at least one outlet port and adapted to cooperate with said inlet ports so as to select or mix the supplies and to control the volume thereof; and sealing means between said piston and said surface and comprising a plurality of axially spaced coaxially disposed annular sealing members located respectively in annular grooves in said piston and bearing with sliding and sealing engagement against said surface, one of said sealing members being arranged in such a manner as to be located always between the two inlet ports without overlapping either of the same in open as well as in closed position of the valve and at least one other of said sealing members being located with a slight stretch fit in its groove to prevent said at least one other sealing member to bulge locally unduly into the associated inlet port, said at least one other sealing member being positioned to move at least partially across at least one of said inlet ports upon axial movement of said piston to said closed position, the arrangement being such that surge pressure occurring upstream of said other annular sealing member at the instant of closure acts on the transverse projected area thereof in the same axial direction as that in which the piston is moved to close the valve.

2. A mixer tap or valve as defined in claim 1, wherein said passage means in said piston comprise a central passage closed at opposite ends and two arcuate slots extending from the outer surface of said piston to said central passage and being spaced from each other in the direction of the axis of said piston a distance substantially equal to the spacing of said inlet ports in the longitudinal direction of said chamber, and at least one passage providing communication between said central passage and said at least one outlet port when said piston is moved to said open position.

3. A mixer tap or valve as defined in claim 2, wherein each of said arcuate slots extends through 180°.

* * * * *